US009744712B2

(12) United States Patent
Letestu et al.

(10) Patent No.: US 9,744,712 B2
(45) Date of Patent: Aug. 29, 2017

(54) METHOD FOR STRETCH-BLOW MOULDING A CONTAINER, INCLUDING MEASURING THE MOVEMENT OF THE STRETCH ROD DURING A BOXING OPERATION

(71) Applicant: SIDEL PARTICIPATIONS, Octeville sur Mer (FR)

(72) Inventors: Mickael Letestu, Octeville sur Mer (FR); Pierrick Protais, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 299 days.

(21) Appl. No.: 14/646,148

(22) PCT Filed: Nov. 14, 2013

(86) PCT No.: PCT/FR2013/052741
§ 371 (c)(1),
(2) Date: May 20, 2015

(87) PCT Pub. No.: WO2014/080109
PCT Pub. Date: May 30, 2014

(65) Prior Publication Data
US 2015/0298386 A1    Oct. 22, 2015

(30) Foreign Application Priority Data
Nov. 20, 2012    (FR) ...................................... 12 61004

(51) Int. Cl.
*B29C 49/12*    (2006.01)
*B29C 49/78*    (2006.01)
(Continued)

(52) U.S. Cl.
CPC .............. *B29C 49/78* (2013.01); *B29C 49/06* (2013.01); *B29C 49/12* (2013.01); *B29C 49/30* (2013.01);
(Continued)

(58) Field of Classification Search
CPC .... B29C 2049/1295; B29C 2049/4892; B29C 2949/7805; B29C 2949/78294; B29C 2949/78584
See application file for complete search history.

(56) References Cited

U.S. PATENT DOCUMENTS 4,177,239 A  * 12/1979  Gittner .................... B29C 49/08
                                                     264/529
4,465,199 A  *  8/1984  Aoki ....................... B29C 49/12
                                                     215/373
(Continued)

FOREIGN PATENT DOCUMENTS

EP        2 173 637 A1    4/2010
EP        2 349 678 A2    8/2011
(Continued)

OTHER PUBLICATIONS

International Search Report, dated Feb. 24, 2014, from corresponding PCT application.

*Primary Examiner* — Robert B Davis
(74) *Attorney, Agent, or Firm* — Young & Thompson

(57) ABSTRACT

Disclosed is a method for manufacturing a container (2) from a blank (3) made of plastic material, in a stretch-blow molding unit (7) including: a mold (11) provided with a wall (13) and a mold base (14) which is axially movable relative to the wall (13) between a low position and a raised position; a stretch rod (22) which is axially movable relative to the mold (11) between a high position and a low position; the method including: a phase of inserting the blank (3) in the mold (11); a phase of stretch-blow molding; a phase of
(Continued)

boxing; a phase of determining the start and end of the boxing phase, respectively, by detecting the movement of the rod (22) from the low position thereof and the stopping of the rod (22) at the raised position thereof.

13 Claims, 5 Drawing Sheets

(51) Int. Cl.
    *B29C 49/06*     (2006.01)
    *B29C 49/36*     (2006.01)
    *B29C 49/30*     (2006.01)
    B29C 49/54     (2006.01)
    B29C 49/48     (2006.01)
    B29K 67/00     (2006.01)
    B29L 31/00     (2006.01)

(52) U.S. Cl.
    CPC ............ *B29C 49/36* (2013.01); *B29C 49/541* (2013.01); *B29C 49/783* (2013.01); *B29C 2049/1295* (2013.01); *B29C 2049/4892* (2013.01); *B29C 2949/7805* (2013.01); *B29C 2949/78294* (2013.01); *B29C 2949/78504* (2013.01); *B29K 2067/003* (2013.01); *B29L 2031/712* (2013.01)

(56) References Cited

U.S. PATENT DOCUMENTS

| | | | |
|---|---|---|---|
| 6,277,321 B1 | 8/2001 | Vailliencourt et al. | |
| 7,314,360 B2* | 1/2008 | Koda | B29C 49/06 425/3 |
| 8,865,036 B2* | 10/2014 | Finger | B29C 49/12 264/40.5 |
| 8,936,458 B2* | 1/2015 | Senn | B29C 49/12 425/135 |
| 9,114,559 B2* | 8/2015 | Finger | B29C 49/12 |
| 2010/0219152 A1 | 9/2010 | Derrien et al. | |
| 2010/0276849 A1 | 11/2010 | Derrien et al. | |
| 2012/0031916 A1 | 2/2012 | Derrien et al. | |
| 2014/0145378 A1* | 5/2014 | Deau | B29C 49/56 264/529 |
| 2014/0203481 A1* | 7/2014 | Derrien | B29C 49/12 264/532 |
| 2015/0290867 A1* | 10/2015 | Derrien | B29C 49/12 264/526 |

FOREIGN PATENT DOCUMENTS

| | | |
|---|---|---|
| FR | 2 921 293 A1 | 3/2009 |
| GB | 2 141 662 A | 1/1985 |
| JP | 2008 254244 A | 10/2008 |
| WO | 2010/058098 A2 | 5/2010 |

\* cited by examiner

METHOD FOR STRETCH-BLOW MOULDING A CONTAINER, INCLUDING MEASURING THE MOVEMENT OF THE STRETCH ROD DURING A BOXING OPERATION

The invention relates to producing containers by stretch-blow-molding from blanks of plastic material such as polyethylene terephthalate (PET).

Whether it involves a preform or an intermediate container that has already undergone a preforming operation, a blank comprises a body, generally rotationally symmetrical, a neck, which constitutes the rim of the container being formed, and a base that closes the body opposite the neck.

The standard production technique consists in introducing the blank, previously heated to a temperature that is higher than the glass transition temperature of the material (about 80° C. in the case of PET), in a mold provided with a wall that defines a cavity having the shape of the container, and in injecting into the blank, through the neck, a fluid, such as a gas (generally air), under pressure to press the material against the wall of the mold.

Under the effect of the pressure, the material that has been softened by heat forms a bubble that swells and expands both in an axial direction that is parallel to the main axis of the mold and in a radial direction that is perpendicular to the axis of the mold.

To avoid any off-centering of the container and to ensure a good equidistribution of the material, the axial stretching of the blank is forced by means of a rod that can be moved axially in the mold, this rod comprising a distal end that pushes the base of the blank until pressing it against a mold base having the shape of the base of the container.

Certain applications require the use of containers known as HR (Heat Resistant) that have the feature of being able to be hot-filled (i.e., with contents, typically a tea or a pasteurized fruit juice, at a temperature that is higher than or equal to about 90° C.) without major deformation, and in particular without making the side wall (or body) of the container oval.

It is known to provide the body of the container with deformable panels intended to absorb the variations in volume that accompany the retraction of the internal volume during cooling. This technique is widely used but is not without drawbacks. Actually, the flexibility of the body is considered to be a quality defect by some users who prefer that the body of the container not become deformed when gripped.

For this reason, it has been proposed to stiffen the body while providing the base of the container with a flexible membrane able to be deformed both during filling (because of the hydrostatic pressure and the temperature of the contents) and during cooling of the contents (accompanied by a retraction of it). Such a technique is shown by the European patent EP 2 173 637 and its U.S. equivalent US 2010/219152 (SIDEL).

The stiffness of the side wall (or body) of the container is generally obtained by means of heat, consisting in keeping the body in contact with the wall of the mold that is heated to a predetermined temperature (generally greater than 100° C.). This operation, known as heat-setting, leads to an increase of the crystallinity of the material, which causes an increase in its stiffness.

For the formation of the base, use is generally made of the technique known as "boxing." In this technique, normally use is made of a molding unit equipped with a mobile mold base that is initially retracted and deployed during forming to push the material in the area of the base, which ensures an over-stretching of the material and thus will allow the formation of complex shapes, particularly deep arches. To illustrate this technique, reference can be made to the European patent application EP 2 349 678 and to its American equivalent US 2012/0031916 (SIDEL).

This technique is satisfactory, but its implementation is, however, difficult. Actually, a compromise must be found between the desire to stretch the material beyond its final shape to increase the taking of the shape of the base and the necessity of preventing the material from setting before having acquired its final shape. Also, because of the mobility of the mold base, it happens that the material is pinched between the wall of the mold and the mold base, which leads to the formation of seams that are unsightly and that consume material at the expense of the base.

The final performances of the container consequently rest on the abilities of the technicians to finely adjust the parameters of the machine, in particular with regard to the time at which the boxing must be conducted.

Generalities are expressed on this subject in the U.S. Pat. No. 6,277,321 (SCHMALBACH-LUBECA). This document, however, does not say much about the means to be used to perform a proper boxing, even though (as is recalled in the document EP 2 349 678 mentioned above) the blow molding has uncertainties as to the manner in which the air bubble expands within the blank, which makes the performing of a proper boxing especially difficult.

The following objectives have driven the inventors who have wished to propose solutions that eliminate the above-mentioned drawbacks:
 to improve the reliability of the method for producing containers with a boxed base (intended in particular for HR applications);
 to improve the repeatability of such a method, i.e., the ability of this method to produce containers of constant quality;
 to maintain or increase the rates of production;
 to facilitate the automation of the production process;
 ultimately, to improve the quality of the containers produced.

For this purpose, there is first proposed a method for producing, from a blank of plastic material, a container having a body and a base, in a stretch-blow-molding unit comprising:
 a mold provided with a wall having the shape of the body of the container, and with a mold base having the shape of the base of the container, the mold base being movable axially relative to the wall between a low position and a raised position,
 a stretch rod that is movable axially relative to the mold between a high position in which the rod is outside of the mold, and a low position in which the rod locally presses the blank against the mold base in its low position;
this method comprising:
 a phase for introduction of the blank into the mold;
 a stretch-blow-molding phase, during which a fluid under pressure is injected into the blank and the stretch rod is moved from its high position to its low position;
 a boxing phase, during which the mold base, initially in low position, is moved to its raised position, and during which the stretch rod, accompanying the mold base, is moved from its low position to a raised position corresponding to the raised position of the mold base;
this method further comprising the determination of the start of the mold base from its low position by detection of the movement of the rod from its low position, and the determination of the arrival of the mold base at its raised position by detection of the stopping of the rod at its raised position.

The knowledge of the actual start and of the actual end of the boxing phase makes it possible to facilitate the adjusting of the machine using reliable and objective data.

To perform the measurements on the rod avoids having to equip the mold base with instrumentation, the environment of which is not very conducive to such instrumentation (presence of vibrations, available space).

Various additional characteristics can be foreseen, alone or in combination:

- determining the instantaneous position of the mold base between its low position and its raised position by detecting the instantaneous position of the rod between the low position and its raised position is foreseen;
- an adjustment operation for a movement order for the mold base, when the start of the mold base does not correspond to a predetermined theoretical start, is foreseen;
- an operation for adjustment of the flow rate of a solenoid valve connecting an actuator carrying the mold base to a source of fluid under pressure, when the actual arrival of the mold base does not correspond to a predetermined theoretical arrival, is foreseen.

Secondly, a stretch-blow-molding unit is proposed for producing, from a blank of plastic material, a container having a body and a base, this stretch-blow-molding unit comprising:

- a mold provided with a wall having the shape of the body of the container, and with a mold base having the shape of the base of the container, the mold base being movable axially relative to the wall between a low position and a raised position;
- a stretch rod that is movable axially relative to the mold between a high position in which the rod is outside of the mold, and a low position in which the rod locally presses the blank against the mold base in its low position;
- means for detecting at least movement of the rod from its low position, and stopping of the rod at a raised position corresponding to the raised position of the mold base, and
- a central processing unit designed to deduce the start of the mold base from its low position, and the arrival of the mold base at its raised position.

Various additional characteristics can be foreseen, alone or in combination:

- the detection means appear in the form of an optical sensor, such as a laser sensor;
- with the stretch-blow-molding unit comprising a frame and the stretch rod being mounted on a carriage that is mobile relative to the frame, the sensor is attached to the frame and points toward the carriage.

Other objects and advantages of the invention will emerge in light of the description given hereafter with reference to the accompanying drawings in which.

Figure 1:
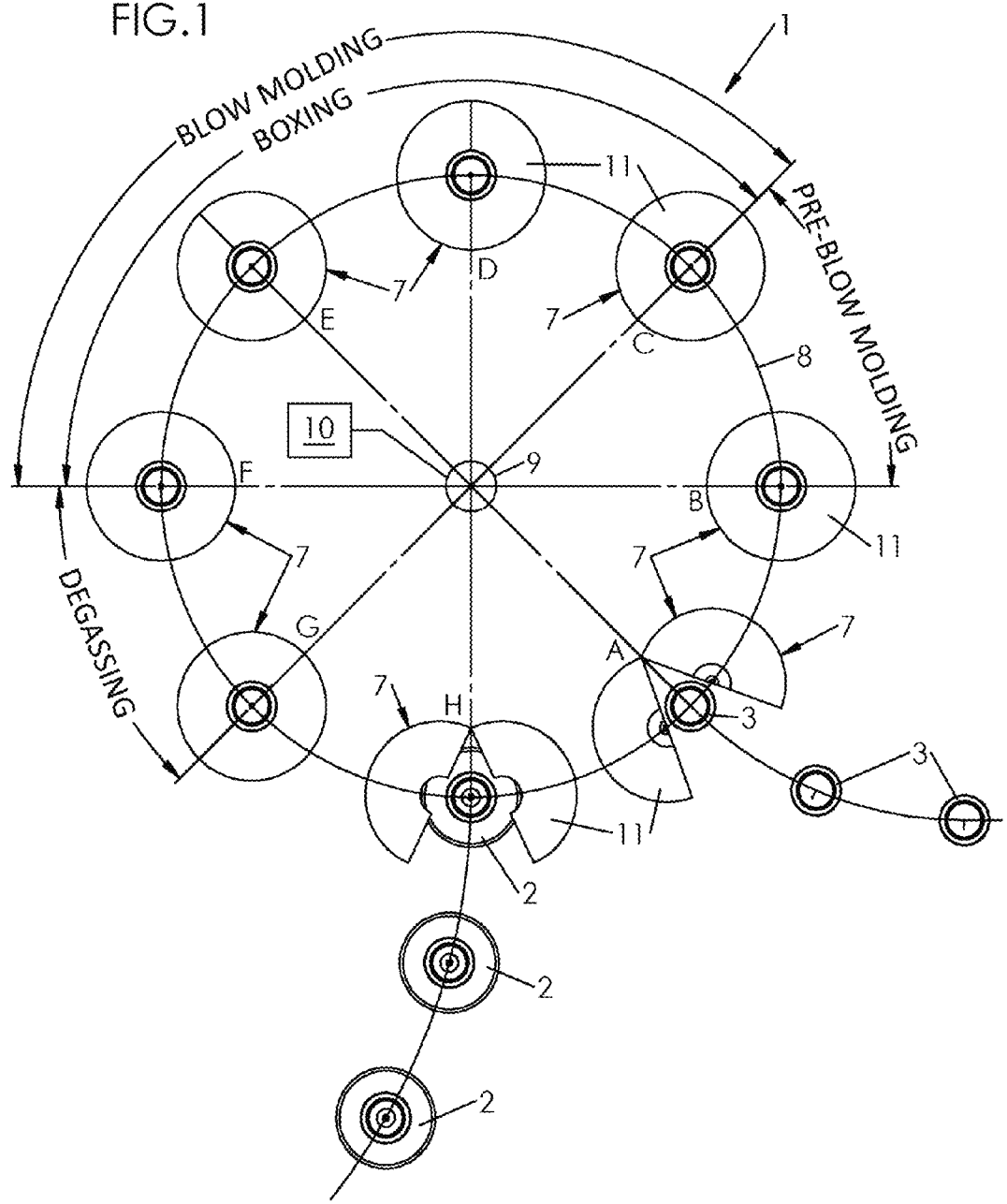
FIG. 1 is a diagrammatic view depicting a machine for forming containers by stretch blow molding, comprising a rotating carrousel and a series of forming units mounted on the carrousel.

Partially depicted in FIG. 1 is a machine 1 for forming containers 2 by stretch blow molding from blanks 3 of plastic material (such as PET).

Although a blank 3 can be an intermediate container coming from a first forming operation, in the following it is considered that the blank 3 is a raw injection preform.

The container 2 to be formed comprises a body or side wall 4, a neck 5 already formed on the preform 3, and a base 6 that extends into the extension of the body 4 opposite the neck 5.

The machine 1 is equipped with at least one stretch-blow-molding unit 7 (and in this particular case with a series of stretch-blow-molding units 7), also called a forming station. According to one embodiment, shown in FIG. 1, the machine 1 comprises a wheel 8 (also called a carrousel) driven in rotation around a central axis and on which the forming stations 7 are mounted, as well as a sensor 9 of the instantaneous angular position of the wheel 8, in the form of, for example, an encoder (i.e., in practice, an instrumented bearing).

Machine 1 comprises a control system that operates its functioning automatically, in the form of a computerized central processing unit 10, and controllers (for example of PLC—Programmable Logic Controller—type) equipped with actuators that individually operate each forming station 7.

Each forming station 7 is equipped with a mold 11 having the shape of the container 2 and with a stretching device 12.

The mold 11 is, for example, of the wallet type and comprises two half-molds hinged around a common hinge and that open to enable, successively, the evacuation of a formed container 2 and the introduction of a preform 3 that has been previously heated in a heating unit (not shown).

The mold 11 has a wall 13 that defines a cavity having the shape of the body 4 of the container, extending along a main axis X, and a mold base 14 provided with an upper surface 15 having the shape of the base 6 of the container 2.

Each forming station 7 is equipped with a pipe (not shown) through which a fluid (particularly a gas, such as air) is injected into the mold 11. Each forming station 7 is also equipped with an injection device comprising a block of actuators connected to the pipe to control the injection of the fluid.

More specifically, the block of actuators comprises one or more solenoid valves that are arranged to put the pipe in communication with, respectively, a source of fluid at a pre-blow-molding pressure (at a value generally between 5 and 10 bar), a source of fluid at a blow-molding pressure (at a value generally between 15 and 40 bar), and the open air. This block of actuators is operated by the central processing unit 10.

Figure 5:
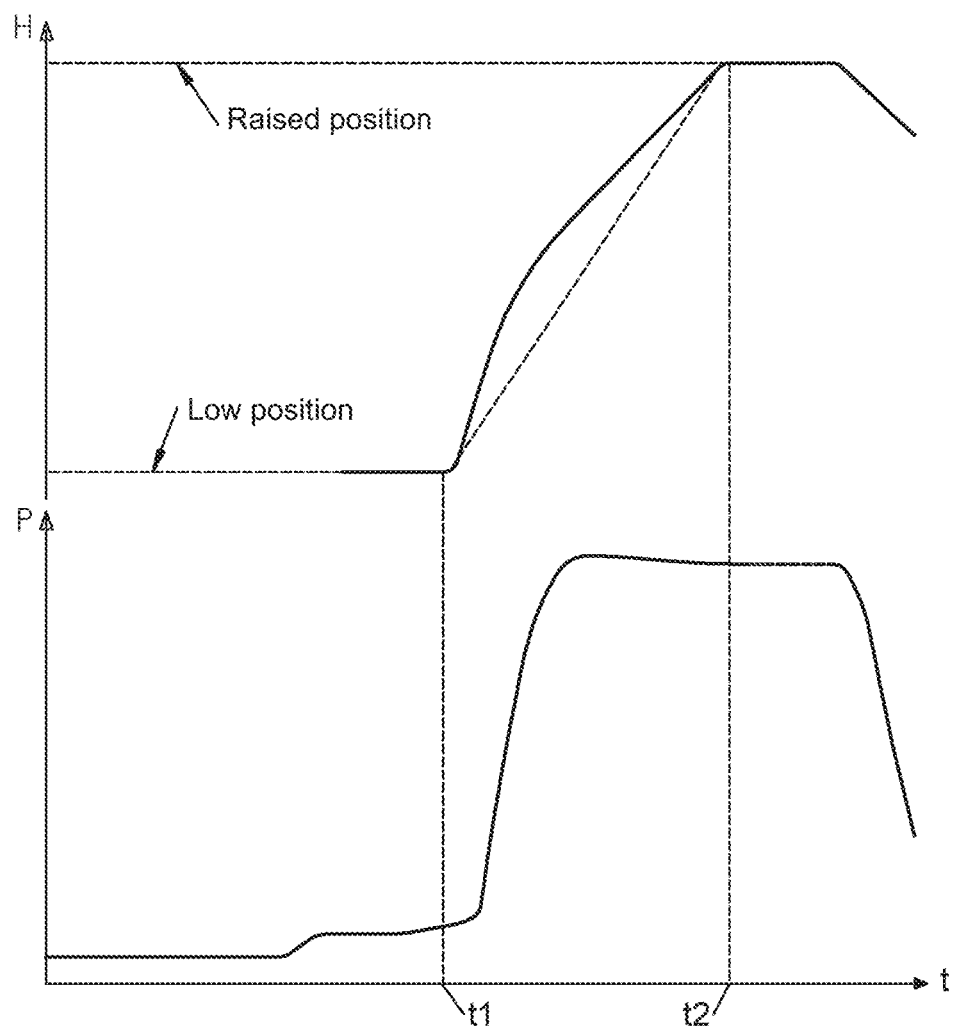
FIG. 5 is a diagram on which the curve of pressure prevailing in the blank during the forming and the position of the mold base are plotted in a superposed manner.

Furthermore, each forming station 7 is provided with a device for measuring the pressure prevailing in the container being formed, connected to the central processing unit 10. This measuring device comprises, for example, a pressure sensor mounted at the level of the pipe, in which the pressure in the course of forming is identical to the pressure prevailing in the container 2. The central processing unit 10 can be programmed to establish a curve of the variations of the fluid pressure (denoted P) prevailing in the preform 3 during forming, as depicted in FIG. 5.

Figure 2:
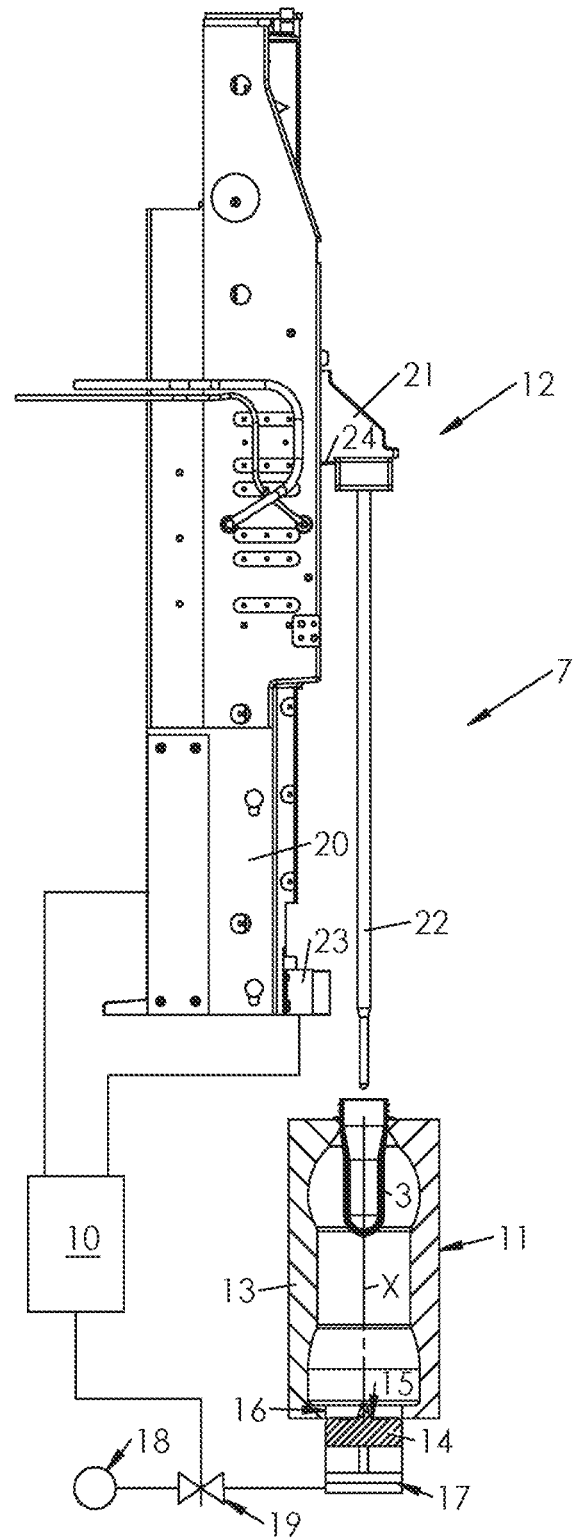
FIG. 2 is a side view showing a forming unit, represented with the stretch rod in high position and the mold base in low position, after introduction of a preform into the mold.
Figure 4:
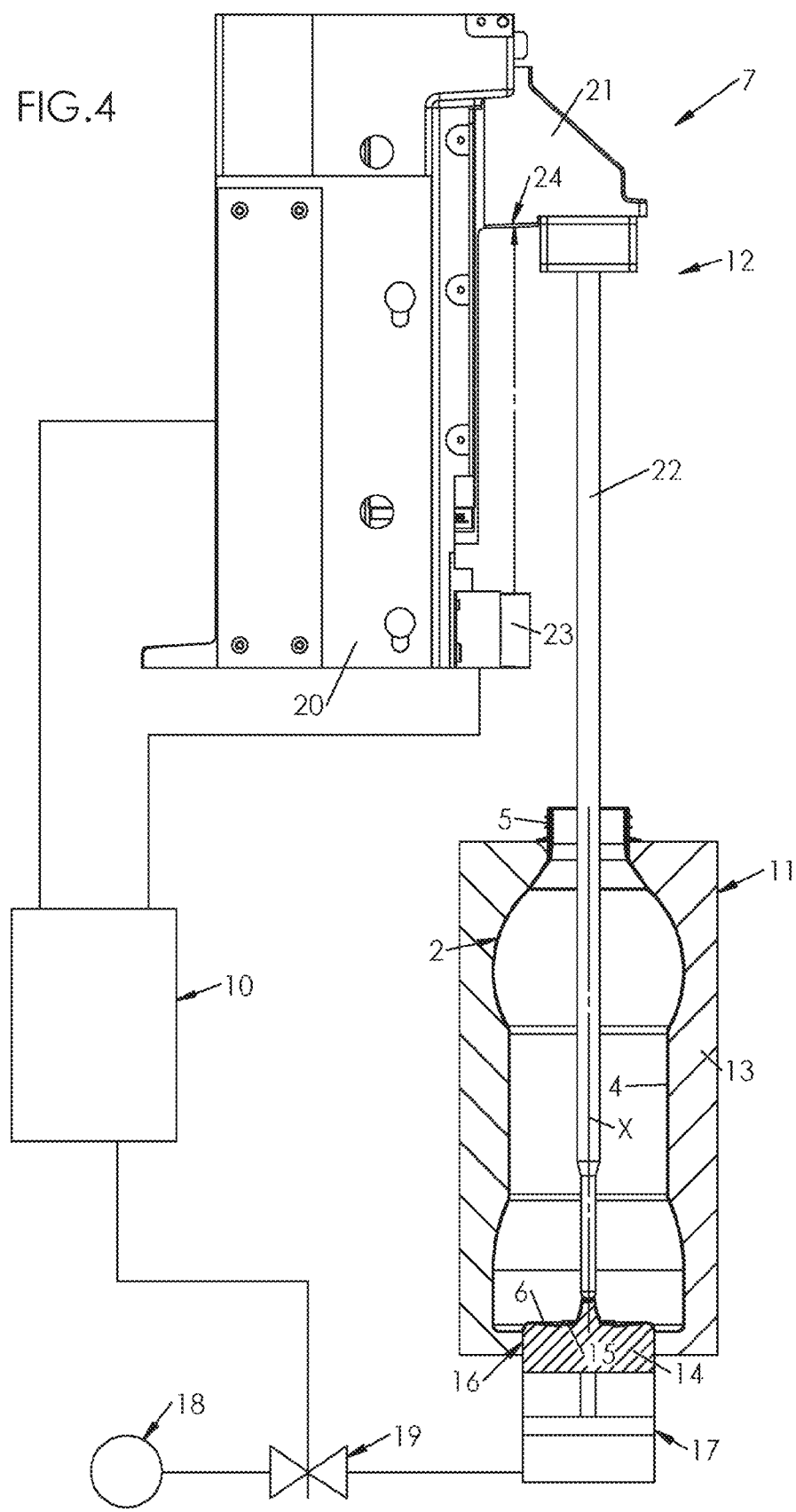
FIG. 4 is a view similar to FIG. 3, where the stretch rod and mold base are both in raised position.

The wall 13 exhibits, in a lower part, an opening 16 that defines a passage for the mold base 14, which is mounted to be able to move axially relative to the wall 13 between:

- a low position (FIG. 2), in which the mold base 14 is separated from the opening 16, and
- a raised position (FIG. 4), in which the mold base 14 blocks the opening 16, and in which the upper surface 15 thus completes the shape of the container 2.

The mobility of the mold base 14 makes it possible to initiate an over-stretching of the base 6 of the container, during a boxing operation that will be described later. The movement of the mold base 14 is, for example, assured by an actuator 17 on which the mold base 14 is mounted, this actuator 17 being connected to a source 18 of fluid (for example, the source of fluid at the blow-molding pressure) by means of a solenoid valve 19 operated by the central processing unit 10.

The stretching device 12 comprises a frame 20, attached to the wheel 8 of the machine 1 and that extends vertically approximately directly above the mold 11.

The stretching device 12 comprises a mobile element that includes a carriage 21 that slides on a rail that is integral with the frame 20, as well as a stretch rod 22 attached to the carriage 21 by an upper end.

The stretching device is, for example, of the magnetic type, and therefore comprises:

- a pair of electromagnets or motors that are integral with the frame 20 and operated by the central processing unit 10;
- a pair of magnetic tracks that are integral with the carriage 21, and each formed with a series of permanent magnets with alternate polarity, placed opposite and at a slight distance from each of the motors.

Figure 3:
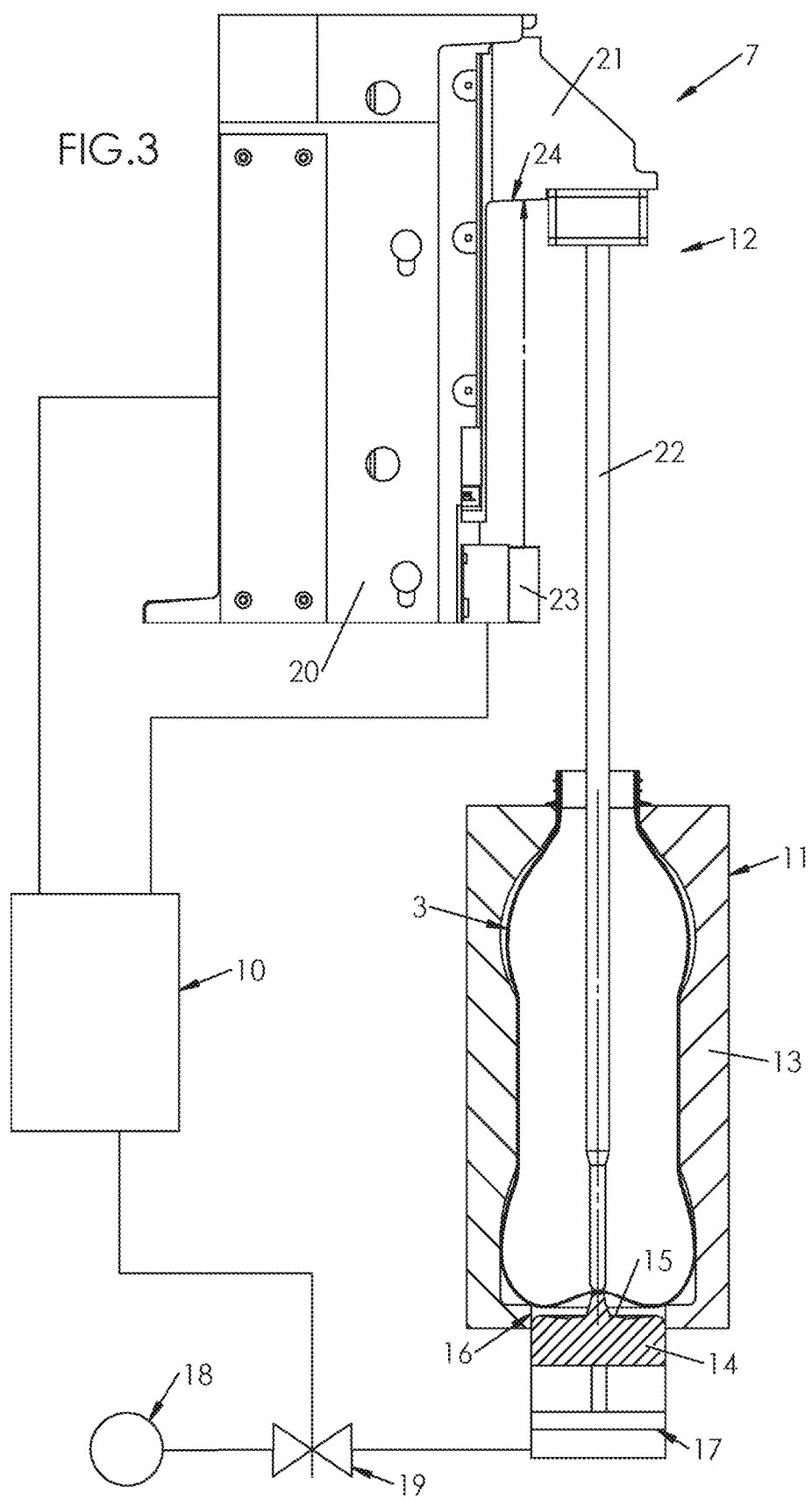
FIG. 3 is a side view showing, in larger scale, the forming unit of FIG. 2, during the forming of the container, in low position of the mold base.

By means of the carriage 21, the rod 22 is thus mounted mobile relative to the frame 20, between:

- a high position (FIG. 2) in which the rod 22 is fully removed from the mold 11, a lower (free) end of the rod 22 that is found at a distance from the mold 11 that is sufficient to enable the evacuation of a formed container 2 and the introduction of a preform 3 to be formed.
- a low position (FIG. 3), in which the stretch rod 22 is received into the mold 11 while coming to the immediate vicinity of the mold base 14 (which in this case is in low position), the material of the container 2 being formed being locally sandwiched between the rod 22 and the mold base 14.

In this position, an injection sprue, present in projection at a lower end of the preform, is lodged in a hollow recess made for this purpose in the center of the upper surface 15 of the mold base 14. Keeping the sprue in the recess guarantees a good distribution of the material during the movement of the mold base 14 from its low position to its raised position. This is why the rod 22 and the mold base 14 are held together during the movement of the mold base 14.

On the machine, the low position of the stretch rod 22 can be pre-adjusted so that an interspace is made between the open end of the rod 22 in low position and the upper surface 15 of the mold base 14 in low position. The value of this interspace, which is predetermined, is less than or equal to the local thickness of material at the center of the base 6 of the container 2. In practice, the interspace is preferably between 0.2 and 1 mm (and, for example, about 0.5 mm).

The production of a container 2 is achieved under the control of the central processing unit 10.

In the example illustrated, where the path of the forming stations 7 is circular and where, in stationary operating conditions of the machine 1, the angular speed of the wheel 8 is approximately constant, the relative angular position of each forming station 7 (deduced by the central processing unit 10 from angular data furnished by the sensor 9 of the wheel 8) and the relative time (appropriate to each forming station 7) can be considered equivalent.

The angular (or time) origin at the beginning of the cycle is assigned arbitrarily, embodied by the point—denoted A in FIG. 1—(or the time) when the preform 3 is introduced into the mold 11. The end of the cycle is embodied by the point—denoted H in FIG. 1—(or the time) when the formed container 2 is ejected from the mold 11.

The start operation consists in introducing preform 3, previously heated to a temperature that is higher than the glass transition temperature of the material (about 80° C. in the case of PET), into the mold 11 (point A). Once the preform 3 is in position and the mold 11 is closed, the central processing unit 10 causes the unlocking then the movement of the carriage 21 (and therefore of the stretch rod 22) from the high position to the low position, in which the free end of the rod 22 comes in contact with the base of the preform 3.

There follows a phase, known as pre-blow-molding (between the points B and C in FIG. 1), which consists in injecting into the preform 3 the fluid at the pre-blow-molding pressure, while moving the stretch rod 22 from its high position to its low position while the mold base 14 is held in its low position.

At the end of this pre-blow-molding phase:

- the container 2 is not completely formed, several areas of the container 2 still not being in contact with the wall 13 of the mold 11 because of the insufficiency of the pressure;
- the stretch rod 22, in its low position, locally presses the base of the preform 3 being formed against the upper surface 15 of the mold base 14. In other words, the base of the preform 3 is sandwiched between the free end of the stretch rod 22 and the upper surface 15 of the mold base 14.

At the end of the pre-blow-molding phase (in practice, as long as the rod 22 has reached its low position), a blow-molding phase of the container 2 is ordered, consisting in injecting into the container 2 being formed the fluid at the blow-molding pressure. As is seen on the lower curve in FIG. 5, the pressure undergoes an abrupt increase from the pre-blow-molding pressure until reaching the blow-molding pressure. The blow-molding phase includes a stabilization step, consisting in maintaining for a predetermined period (corresponding in practice to a predetermined angle, in this particular case between the points D and F in FIG. 1) the blow-molding pressure in the container 2 so as to properly press the material against the wall 13 of the mold 11 (and thus to facilitate the taking of the shape of the container 2 while ensuring a heat-setting of the material).

During the blow-molding phase (and optionally straddling the pre-blow-molding phase), an operation is ordered (by the central processing unit 10) for boxing the base 6 of the container 2 being formed, which consists in moving the mold base 14 from its low position to its raised position by actuating the actuator 17.

So as to make possible the raising of the mold base 14, the stretch rod 22 is preferably disengaged as soon as the movement of the mold base 14 is ordered. The rod 22 accompanies in this way the mold base 14 during the period of the boxing.

After the blow-molding phase, a final phase of degassing is ordered (between the points F and G), consisting in cutting the supply of fluid under blow-molding pressure while maintaining the venting to the open air. The effect of this is a complete depressurization of the container 2, whose inner pressure decreases to the atmospheric pressure.

The container 2 thus formed is then removed from the mold 11 (point H).

The quality of the base 6 of the container 2 depends in large part on the boxing. A boxing that is initiated (or finalized) too early can prove useless, the material being insufficiently stretched. The effect of this is then a poor taking of shape and/or an insufficient stiffness. Initiated (or finalized) too late, the boxing can lead to a pinching of the material between the wall 13 and the mold base 14 and the appearance of beads that are unsightly and that consume material, indeed a local slice of the material. It is understood therefore that it is necessary to properly adjust, relative to all of the other forming operations, at least the beginning and the end of the boxing.

Taking into account the response times of the solenoid valves, which can be estimated thanks to the manufacturer's data but without this data being guaranteed, it is not sufficient to be based on the order times of opening and closing the solenoid valve 19 for controlling the actuator 17 that carries the mold base 14. Further, since the raised position of the mold base 14 corresponds to an end-of-travel stop, the time (or the angular position) at which the mold base 14 reaches raised position cannot be deduced by any machine parameter.

This is why it is desired to determine at least the actual start of the mold base 14 from its low position and the actual arrival of the mold base 14 at its raised position. In theory, the boxing is initiated at the same time as (or preferably in a manner slightly prior to) the blow-molding phase (at the point C) and is ended during the stabilization step (between the points D and F).

By "to determine," an occurrence is meant to locate this occurrence during the forming, either as a function of time, or as a function of the position of the forming station 7 on its path.

It is theoretically possible to equip the mold base 14 directly with instruments to obtain the data that makes it possible to deduce at least the start of the mold base 14 from its low position and the arrival of the mold base 14 at its raised position. However, in numerous machine configurations, the environment of the mold base 14 is not very conducive to such instrumentation, because in particular of vibrations by which the mold base 14 and its actuator 17 are affected, of unfavorable heat conditions (high or fluctuating temperature), and of possible moisture resulting from leaks of fluid (even minor) at the connections between the mold 11 and supply circuits of heat-transfer fluid intended to heat the wall 13 and/or the mold base 14.

This is why, according to the invention, it is intended to equip with instruments the stretch rod 22, which remains coupled to the mold base 14 during its raising, and to obtain the above-mentioned data concerning the mold base 14 by means of the stretch rod 22.

Thus:
the start of the mold base 14 from its low position is determined by detecting the movement of the rod 22 from its low position, which corresponds (apart from the material thickness) to the low position of the mold base 14;
the arrival of the mold base 14 at its raised position is determined by detecting the stopping of the rod 22 at a raised position corresponding (apart from the material thickness) to the raised position of the mold base 14.

In practice, as soon as the movement of the rod 22 from its low position is detected, the central processing unit 10 stores the time, denoted t1 in FIG. 5, (or the angular position of the forming station 7 in question) at which this movement is detected. In FIG. 5, H represents, as the ordinate of the upper curve, the position of the mold base 14.

Also, as soon as the stopping of the rod 22 at its raised position is detected, the central processing unit 10 stores the time, denoted t2 in FIG. 5, (or the angular position of the forming station 7 in question) at which this stopping is detected.

According to a particular embodiment, these two times (or these two angular positions) are considered sufficient to permit, by feedback and reprogramming of the central processing unit 10, an adjustment of the order for opening the solenoid valve 19 of the actuator 17 (on which the actual start of the mold base 14 depends) or of the flow rate of the solenoid valve 19 (on which the speed of movement of the mold base 14 depends, and therefore the actual arrival of the mold base 14 at its raised position).

Such an adjustment can be made when the actual start of the mold base 14 from its low position (or the actual arrival of the mold base 14 at its raised position) does not correspond to a predetermined theoretical start (or a predetermined theoretical arrival), for which it is determined that the boxing is performed satisfactorily.

It is conceivable to be satisfied with these values (time or angular position) for actual beginning and for actual ending of the boxing while ignoring the behavior of the material during the boxing as long as its beginning and its ending are determined to be correctly situated during the forming.

As a variant, it is conceivable to use these values to reconstruct a movement curve of the mold base 14, assumed to be linear as a function of time. This curve is represented by the dotted line between the times t1 and t2 in FIG. 5.

According to another embodiment, the position of the mold base 14 between its low position and its high position is determined in a systematic and repeated way (instantaneously if it is looked at on a time basis, and by angle unit if it is looked at on an angular basis). This position is deduced from a systematic and repeated measurement of the position of the rod 22 between its low position and its raised position. Then, the actual curve of the movements of the mold base 14 between the start from its low position (time t1) and the arrival at its raised position (time t2) can be deduced from it.

This curve is not necessarily linear, because of the variations of pressure inside the container 2 being formed. This is the case particularly when the boxing is initiated at the beginning of the blow-molding phase (or slightly before it). In this case, the abrupt increase of pressure in the container 2 results in an increasing strength on raising of the mold base 14. If there is no change in the flow rate from the solenoid valve 19 supplying the actuator 17, a reduction in the speed of movement of the mold base 14 then occurs gradually from its movement (as shown by the solid line between the times t1 and t2 on the upper curve of FIG. 5) and accordingly a delay in the arrival of the mold base 14 at its raised position.

By providing instantaneous position data of the mold base 14 (via the measurement of the instantaneous position of the rod 22), it is possible, by feedback from one forming cycle to the next cycle, to cause the flow rate of the solenoid valve 19 to vary in order to adjust the speed of movement of the mold base 14 (for example following a linear model) and thus to adjust the arrival time (or point) of the mold base 14 at its raised position.

Specifically, the instrumentation of the rod 22 can be of the capacitance type and can comprise, for example, a low-position presence detector of the rod 22, and a high-position presence detector of the rod 22.

However, according to a preferred embodiment, the instrumentation of the rod is of the optical type.

In this case, the instrumentation comprises an optical sensor 23 for measuring distance, for example of the laser telemetric type. This type of sensor is, in particular, marketed by the Micro Epsilon company under the trade name Opto NCDT. The sensor 23 is connected to the central processing unit 10 with which it communicates its measurements.

The sensor 23 is integral with the frame 20 and points to a lower face 24 of the carriage 21 that carries the stretch rod 22, so as to detect any movement (or to measure the position) of the carriage 21, and therefore of the stretch rod 22.

The sensor 23 detects at least the movement of the rod 22 from its low position and its stopping at its high position. It can also detect instantaneously (i.e., continuously) the positions of the rod 22 between its low position and its high position.

From the measurements coming from the sensor 23, the central processing unit 10 deduces at least the actual start of the mold base 14 from its low position and its actual arrival at its raised position. As a variant, and depending on the type of sensor, the central processing unit 10 can determine the actual instantaneous position of the mold base 14 between its low position and its high position, i.e., during the entire boxing period.

On the basis of these measurements, the central processing unit 10 can perform, by feedback, a modification of the machine parameters (particularly the time or the angle for control of the solenoid valve 19, and optionally its flow rate).

A certain number of advantages result from the structure and the method presented above.

Firstly, the determination of the actual beginning (corresponding to the actual start of the mold base 14 from its low position) and of the actual ending (corresponding to the actual arrival of the mold base at its raised position) of the boxing facilitates the automation of the machine 1 by making possible, by feedback, an automatic adjustment at least of the order for opening the solenoid valve 19.

Secondly, since this adjustment can be conducted systematically, the effect is an improvement of the reliability and of the repeatability of the process for manufacturing containers with a boxed base.

Thirdly, by limiting the machine stops necessary for a manual reprogramming, the rates of production are increased.

Fourthly, the optimization of the forming process makes it possible to improve the quality of the containers produced.

The invention claimed is:

1. Method for producing, from a blank (3) of plastic material, a container (2) having a body (4) and a base (6), in a stretch-blow-molding unit (7) comprising:
   a mold (11) provided with a wall (13) having the shape of the body (4) of the container (2), and with a mold base (14) having the shape of the base (6) of the container (2), the mold base (14) being movable axially relative to the wall (13) between a low position and a raised position;
   a stretch rod (22) that is movable axially relative to the mold (11) between a high position in which the rod (22) is outside of the mold, and a low position in which the rod (22) locally presses the blank (3) against the mold base (14) in the low position;
   this method comprising:
   a phase for introduction of the blank (3) into the mold (11);
   a stretch-blow-molding phase, during which a fluid under pressure is injected into the blank (3) and the stretch rod (22) is moved from the high position to the low position;
   a boxing phase, during which the mold base (14), initially in low position, is moved to the raised position, and during which the stretch rod (22), accompanying the mold base (14), is moved from the low position to a raised position corresponding to the raised position of the mold base (14);
   wherein the method comprises the determination of the start of the mold base (14) from the low position by detection of the movement of the rod (22) from the low position, and the determination of the arrival of the mold base (14) at the raised position by detection of the stopping of the rod (22) at the raised position.

2. Method according to claim 1, further comprising determining the instantaneous position of the mold base (14) between the low position and the raised position by detecting the instantaneous position of the rod (22) between the low position and the raised position.

3. Method according to claim 1, further comprising an operation for adjustment of a movement order for the mold base (14), when the start of the mold base (14) does not correspond to a predetermined theoretical start.

4. Method according to claim 1, further comprising an operation for adjustment of the flow rate of a solenoid valve (19) connecting an actuator (17) carrying the mold base (14) to a source (18) of fluid under pressure, when the actual arrival of the mold base (14) does not correspond to a predetermined theoretical arrival.

5. Stretch-blow-molding unit (7) for producing, from a blank (3) of plastic material, a container (2) having a body (4) and a base (6), this stretch-blow-molding unit (7) comprising:
   a mold (11) provided with a wall (13) having the shape of the body (4) of the container (2) and with a mold base (14) having the shape of the base (6) of the container (2), the mold base (14) being movable axially relative to the wall (13) between a low position and a raised position;
   a stretch rod (22) that is movable axially relative to the mold (11) between a high position in which the rod (22) is outside of the mold, and a low position in which the rod (22) locally presses the blank (3) against the mold base (14) in the low position;
   the stretch-blow-molding unit (7) further comprising means (23) for detecting at least movement of the rod (22) from the low position, and stopping of the rod (22) at a raised position corresponding to the raised position of the mold base (14), and a central processing unit (10) designed to deduce the start of the mold base (14) from the low position, and the arrival of the mold base (14) at the raised position.

6. Stretch-blow-molding unit (7) according to claim 5, wherein the detecting means appear in the form of an optical sensor (23).

7. Stretch-blow-molding unit (7) according to claim 6, wherein the optical sensor (23) is a laser sensor.

8. Stretch-blow-molding unit (7) according to claim 6, further comprising a frame (20), wherein the stretch rod (22) is mounted on a carriage (21) that is mobile relative to the frame (20), and wherein the sensor (23) is attached to the frame (20) and points toward the carriage (21).

9. Method according to claim 2, further comprising an operation for adjustment of a movement order for the mold base (14), when the start of the mold base (14) does not correspond to a predetermined theoretical start.

10. Method according to claim 2, further comprising an operation for adjustment of the flow rate of a solenoid valve (19) connecting an actuator (17) carrying the mold base (14) to a source (18) of fluid under pressure, when the actual arrival of the mold base (14) does not correspond to a predetermined theoretical arrival.

11. Method according to claim 3, further comprising an operation for adjustment of the flow rate of a solenoid valve (19) connecting an actuator (17) carrying the mold base (14) to a source (18) of fluid under pressure, when the actual arrival of the mold base (14) does not correspond to a predetermined theoretical arrival.

12. Method according to claim 4, further comprising an operation for adjustment of the flow rate of a solenoid valve (19) connecting an actuator (17) carrying the mold base (14) to a source (18) of fluid under pressure, when the actual arrival of the mold base (14) does not correspond to a predetermined theoretical arrival.

13. Stretch-blow-molding unit (7) according to claim 7, further comprising a frame (20), wherein the stretch rod (22) is mounted on a carriage (21) that is mobile relative to the frame (20), and wherein the sensor (23) is attached to the frame (20) and points toward the carriage (21).

\* \* \* \* \*